United States Patent [19]

Eggers et al.

[11] 3,873,962

[45] Mar. 25, 1975

[54] AIRCRAFT WARNING LAMP SYSTEM
[75] Inventors: Frederich W. Eggers, Huntington Beach; Gerald K. Brewer, Anaheim, both of Calif.
[73] Assignee: Symbolic Displays, Inc., Irvine, Calif.
[22] Filed: Nov. 28, 1973
[21] Appl. No.: 419,680

[52] U.S. Cl......................... 340/25, 340/331, 340/332
[51] Int. Cl................................................ G08g 5/00
[58] Field of Search............... 340/25, 27 R; 240/1.2

[56] References Cited
UNITED STATES PATENTS
2,832,059 4/1958 Adler.................................... 340/25
3,488,558 1/1970 Grafton................................ 340/25
3,676,736 7/1972 Starer.................................... 340/25

*Primary Examiner*—Thomas B. Habecker
*Attorney, Agent, or Firm*—George F. Bethel

[57] ABSTRACT

An aircraft warning lamp system is disclosed herein which utilizes the aircraft's alternating current power supply for its control as well as its power. A combination of integrated circuits and discrete components break down the cyclical signal of the power supply by causing a digital counter to divide the 400 cycle input into a usable control pulse for flashing high intensity warning lamps.

A series of anti-collision flashing light modules contain a high voltage power supply to operate a xenon flash tube by means of a pulse derived from the alternating current by a timing and synchronization circuit. The module produces simultaneous flashing of the units, or alternate operation of each flashing unit with or without the navigation lights. The operation of the flash tubes is cyclical and continues as long as there is a power input.

The entire system provides a single wire connection to the flash tubes without the requirement of rewiring the aircraft or providing substantial control circuits at various portions extrinsic to the power supply.

21 Claims, 10 Drawing Figures

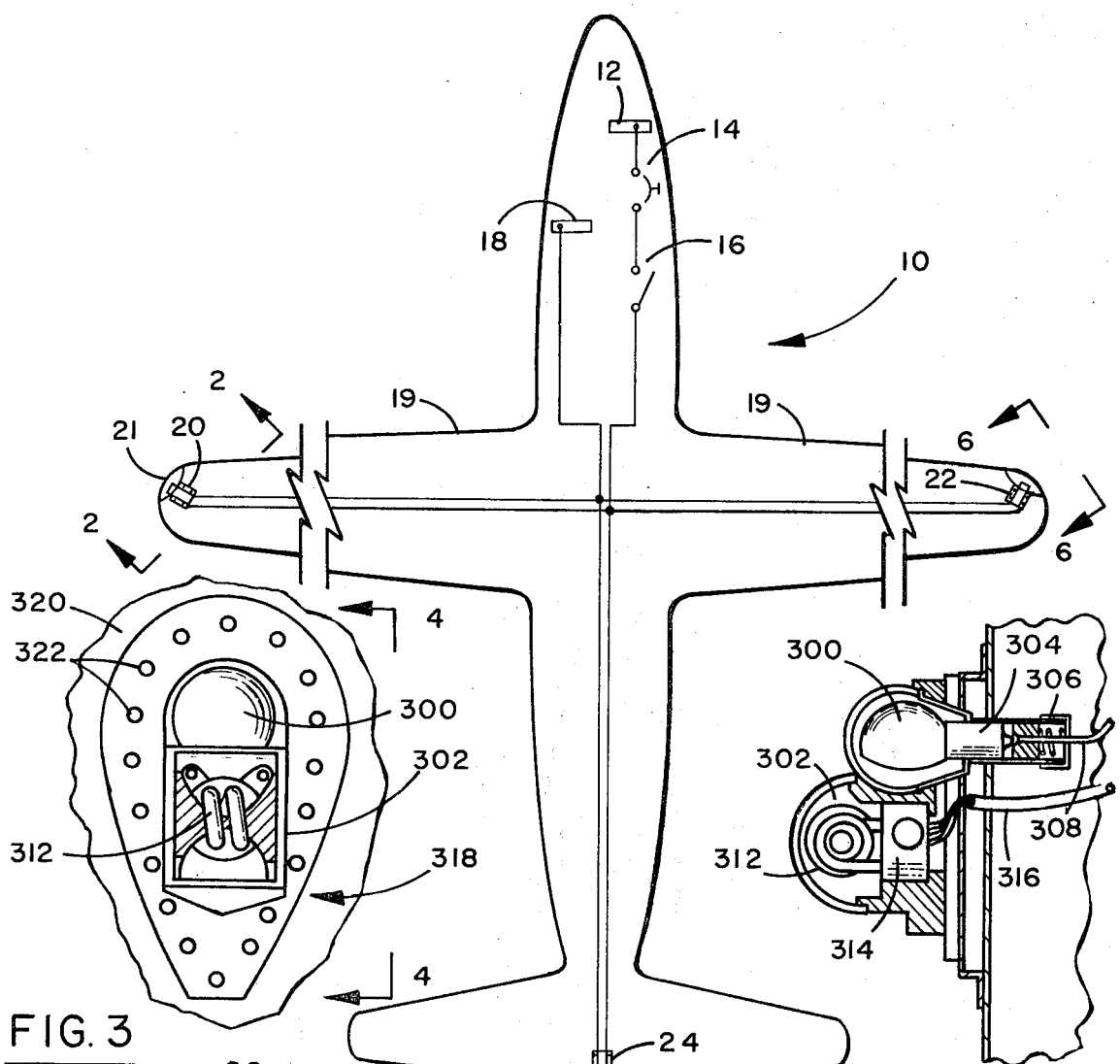
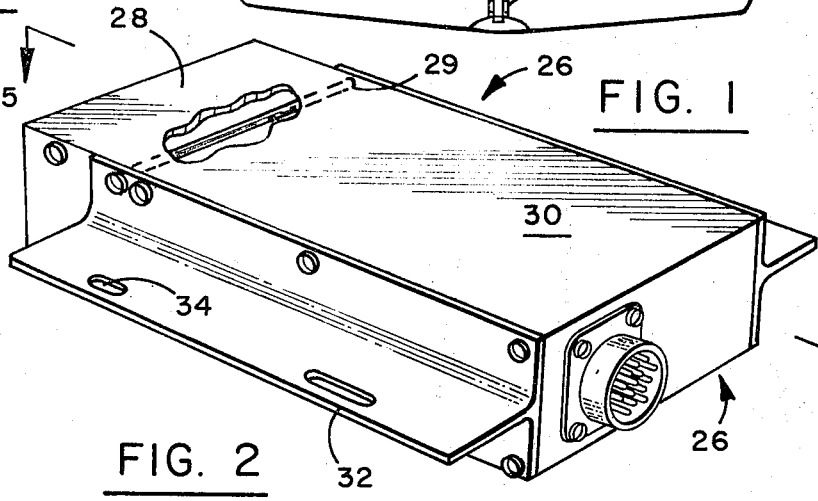
FIG. 1
FIG. 2
FIG. 3
FIG. 4

AIRCRAFT WARNING LAMP SYSTEM

FIELD OF THE INVENTION

The field of this invention resides within the art and aircraft warning light systems. More specifically, the invention is predicated upon the utilization of the on-board power of an aircraft to operate a series of lights in a visible and well illuminated manner. The lights can be xenon flash tubes in combination with incandescent navigation lights which can burn constantly during the operation of the aircraft. The whole system is incorporated within the field of the electrical system of an aircraft, and more particularly, as it relates to the operation of warning lights.

THE PRIOR ART

The prior art relating to aircraft lights is directed to different lighting systems in the form of static incandescent lights, strobe or flashing lights, and mechanically rotatable beacons.

Many of the foregoing lights do not provide the flexibility or visibility of this particular system. As can be appreciated, when an incandescent light is utilized, it does not provide a substantial flash during daytime operations. If the sky is particularly cloudy, the light does not provide sufficient warning light at night. In order to supplement this lighting, various beacons as previously alluded to, as well as flashing lights, have been utilized. The beacons and the flashing lights have generally been installed by utilization of various wires and leads to the location where they are mounted. Specifically, the lights are utilized at the wing tips, the top and bottom of the fuselage, and oftentimes in the tail section.

As a general rule, the mechanical oscillating light that oscillates in either a fully rotational manner, or with respect to certain axes, does not function in the most advantageous manner. Specifically, the mechanical oscillating lights firstly require a lamp suspended in a particular moveable manner with pivotal linkages and drives in order to rotate it in the prescribed axis. Some form of electromechanical means, such as a motor, must be utilized to rotate the lamp or reflector. When electromechanical means are utilized, it can be appreciated that there is more than one operative element to go wrong. In most cases, it has been found that solid state elements such as non-moving electronic devices, have a substantially longer life span than electromechanical elements which must require mechanical linkages, gears, and other drive means. Furthermore, a prime mover such as a motor, or servo, must be utilized and consequently, the system has two points of unreliability. The first point of unreliability is the fouling or jamming of the linkages. The second problem is that the prime mover must always be maintained so that it functions in a continuous manner.

It can be appreciated that when a breakdown occurs in a rotating beacon or other warning means, the pilot is not necessarily made aware of it. As a consequence, attendant danger can reside within the continued operation of the aircraft. This invention overcomes the foregoing deficiencies of mechanical beacons by eliminating all electromechanical movement. Furthermore, it provides greater effective candle power per watt of input power with an attendant low maintenance cost because of its high reliability.

This invention has an added feature, inasmuch as it is directly interchangeable with existing oscillating lights. The installation of the system requires no additional aircraft wiring or mechanical modifications. Also, it can operate as a "one wire" system.

In order to enhance the modular capabilities, each unit has substantial interchangeability with its self-contained power supply. There is no requirement or need for any rotational elements or any drive functions within the system.

In addition to the foregoing advantages, the system can be utilized with certain incandescent lights adjacent thereto, or in a supplementary manner at other locations.

Each unit has its flash synchronization automatically controlled in the timing unit of the integrated power supply module. The entire system operates in such a manner as to provide a timed flash consonant with the cyclical output of the on-board power generating system. In other words, the generating capability of the aircraft functions to create a signal in its cyclical current swings, which is then utilized for operating the timing circuit of the invention.

The prior art does not provide substantial lighting intensity over large areas. The typical horizontal and vertical lighting intensities required by the Federal Aviation Administration are substantially enhanced with this invention by virtue of its angular as well as overall distance coverage.

The breadth of coverage as well as the distance is an important factor in aircraft warning lamp systems. The prior art has not provided sufficient breadth due to the fact that prior lights do not consistently cover a spectrum sufficiently large to provide ample warning to adjacent aircraft when they are in a high performance mode. As a consequence, during some flights, collisions are narrowly averted and substantial dangers are imposed on the occupants of aircraft that are flying relatively close to each other.

This invention also overcomes the deficiencies of the prior art by eliminating the requirement of special wiring being utilized within the system. The wiring for this invention has already been incorporated in the aircraft in most cases. As a consequence, the invention can be retrofitted into existing aircraft already incorporating warning lights running from the general fuselage area to the wing tips and other portions of the aircraft.

The warning lights of this system also enable a series of warning light modes to function in the form of incandescent navigation lights in conjunction with the flashing lights. The invention also enables a switching of the flashing lights from one mode to the other in a positive manner, as distinguished from the prior art.

Specifically, in the prior art it has been necessary to blindly operate certain switches which go from one position to the other, depending upon the way they are energized in the cockpit. In these instances, the operator of the aircraft does not realize which mode he is in. As a consequence, the operator of the aircraft can only tell by looking at the wing tips and determining whether the night or day flashing lights are functioning, at which time he will alternatively switch to the other desired mode if necessary.

The daytime flashing lights can often be so strong near a cloud bank that they will temporarily blind a pilot for a brief instant, thereby creating a hazardous condition. This invention overcomes the foregoing deficiency of the prior art by indicating to the pilot exactly what mode the flashing lamps are in.

It will be seen from the following specification that this invention has substantial reliability, flexibility, as well as ease of installation and is a distinct improvement over the prior art as to both apparatus and function.

SUMMARY OF THE INVENTION

In summation, this invention comprises a new and novel aircraft warning lamp system having the capability of being installed with existing aircraft wiring, and operates and is controlled by the on-board power source.

More particularly, the invention utilizes flashing lights for night or daytime usage that can be energized by a power supply receiving its power from the aircraft. The power supply generated by the aircraft has a cyclical wave form which is converted to a signal to operate circuitry for the timing of the flashing of the lights. For example, the cyclical power can be divided down to one cycle per second by an integrated circuit which then causes the power supply to energize the flashing lights with a xenon gas therein which is ionized by a triggering wire in adjacent relationship to the tube. The triggering wire is triggered in response to the one cycle per second timing signal which has been divided out from the 400 cycle per second power supply.

The entire system can operate with not only the flashing lamps, but also incandescent lamps which are generally referred to as navigation lamps. The system utilizes a unique approach to flash the lamps in synchronization, which requires no separate timer or timing lines between the units. Instead, each unit contains an electronic counter which is pre-set upon application of power so that they simultaneously start counting from the same cycle of the on-board power supply. This causes all the flashing lights to be locked together so that even if the input power frequency changes, the flash rate will change proportionately in all units and remain in synchronization.

A unique switch controlled by diode voltage drop is utilized in the invention for switching the flashing lights between certain flashing light functions, or between a navigational incandescent lamp function and the flashing lamp function itself. In addition thereto, a high voltage supply for charging the flash capacitors is utilized with a high efficiency voltage quadrupler circuit. This generates less heat than conventional circuits, such as step-up transformers and causes a better operation of the entire unit.

The system is completely modular and is designed to provide ease of maintenance in a manner unknown to the mechanical beacon and incandescent lamp warning lamp systems of the prior art. The flash lamp and the flash capacitors are generally the only portion of the system which require periodic maintenance by replacement. Also, as will be seen from the mechanical configuration of the mounting module, the components have been specifically designed to facilitate maintainability.

BRIEF DESCRIPTION OF THE DRAWINGS

The invention will be more clearly understood by reference to the description below taken in conjunction with the accompanying drawings wherein:

FIG. 1 shows a schematic plan view of an aircraft utilizing the lighting system with its most basic elements being shown therein;

FIG. 2 shows a perspective end view of the module of this invention in the direction of lines 2—2 of FIG. 1;

FIG. 3 shows an alternative plan view of a combination navigation and flashing light module that can be utilized with this invention;

FIG. 4 shows a cross-section of the module of FIG. 3 along lines 4—4 thereof;

DESCRIPTION OF THE PREFERRED EMBODIMENTS

The General Configuration

Figures 5, 6:
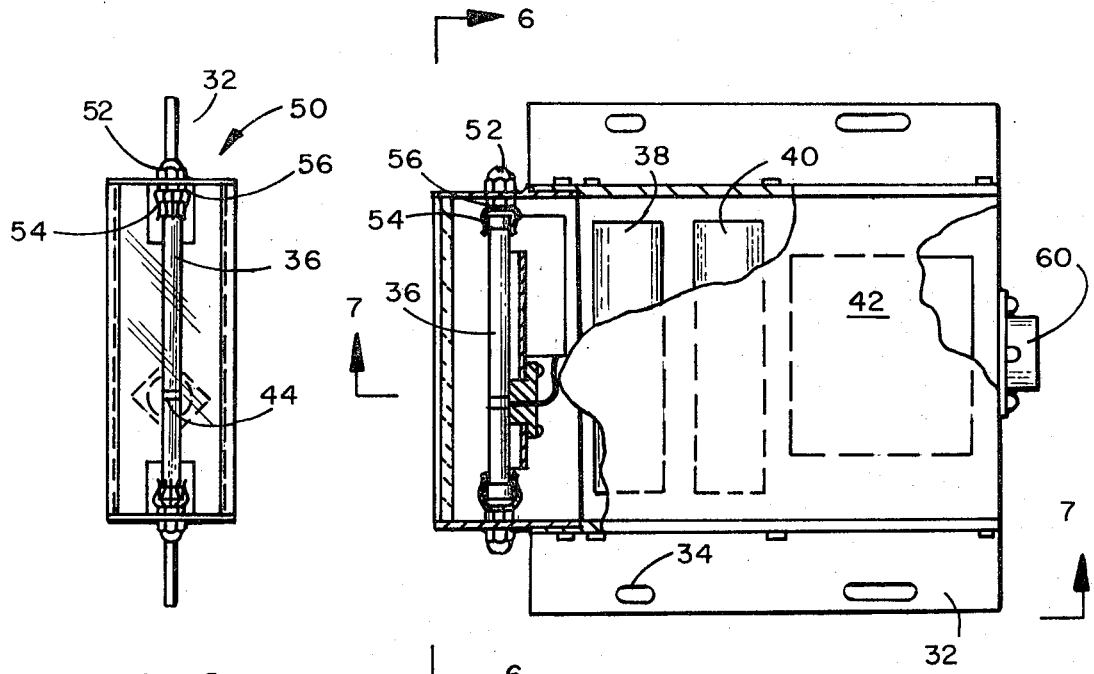
FIG. 5 shows a partially broken away plan view of the module along lines 5—5 of FIG. 2.
FIG. 6 shows an end view of this invention in the direction of lines 6—6 of FIG. 5.
Figure 7:
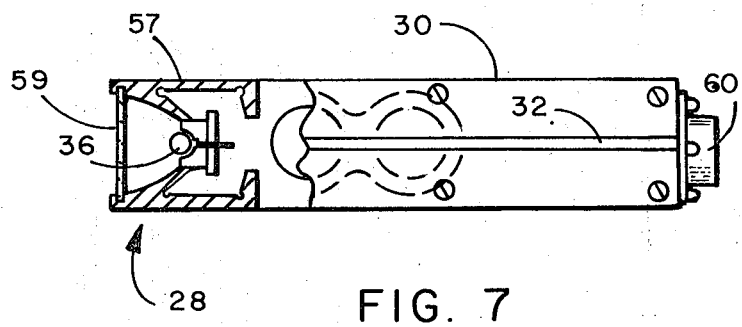
FIG. 7 shows a fragmented, partially broken away sectioned view along lines 7—7 of FIG. 5.
Figure 8:
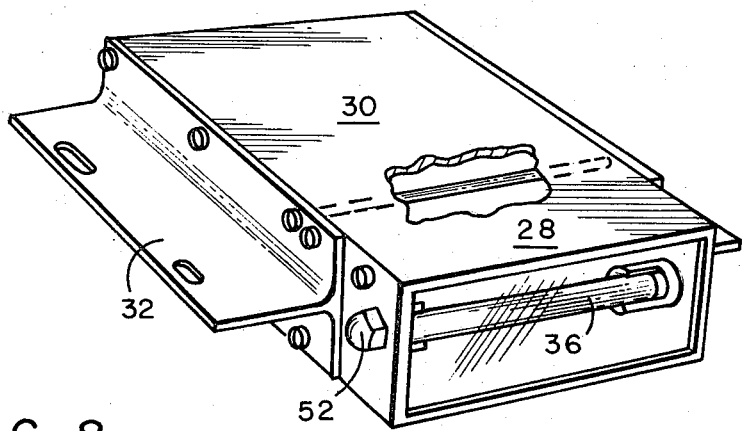
FIG. 8 shows a perspective view of the flash head and module of this invention in opposite relationship to that shown in FIG. 2.

Looking more particularly at FIG. 1, a schematic plan view of an aircraft 10 is shown. The aircraft 10 has a power bus 12. The power bus 12 is the bus which is generally oriented to service the power requirements of the aircraft from which, of course, the different portions of the aircraft requiring electricity receive their respective power. In this specific showing, a commercial aircraft is shown which provides the power requirements of the entire aircraft, through its alternator.

A circuit breaker 14 interconnecting the bus 12 is utilized to provide power to the system through a switch 16. The switch 16 is used for an on and off capability for the entire lighting system. As will be further described and delineated, the switch 16 can also be replaced by a day and night operation switch. Specifically, the day and night operating switch causes the switching from a night strobe to a daytime strobe. Furthermore, the switch 16 can be substituted to provide other functions as they relate to the operation of the combination navigation lights and strobes or high intensity lights in a manner to be described.

A ground 18 is shown wherein a power line is terminated thereto. Often, the ground is wired through the aircraft. In such cases, the ground would avoid skin effects, thereby eliminating electro-magnetic interference and other disadvantages of grounding the plane's power requirement through the skin of the aircraft. This, of course, eliminates the disadvantages with regard to having electro-magnetic interference. Of course, it should be understood that the ground wire is not necessary and each one of the respective components hereof can be grounded directly to the aircraft or through some other suitable grounding means.

Looking more particularly at the wings 19, it can be seen that each wing tip has a lighting and power module 20 and 22 tied into the system and exposed through a window 21. Furthermore, there is a lighting and power module 24 in the tail of the aircraft. Oftentimes, the power and lighting module 24 in the tail is optional.

The modules forming the respective units 20, 22 and 24 are generally in the form of a rectangular container 26 comprising both the power supply and a flash head. Specifically, there is a strobe or high intensity flash head 28 which is shown connected to a discrete power supply 30. In this manner, the power supply 30 and the flash head 28 can be removed from each other by removal of the screws along the side of a mounting bracket 32. In other words, the power supply 30 and the flash head 28 are separated along the parting line 29 which is their interfacing point.

The mounting brackets 32 have openings 34 which provide a screw mounting of the brackets 32 with their respective power supply 30 and flash head 28. The brackets 32 can be mounted in the existing accommodations which are provided in an aircraft. Specifically, the brackets 32 in this case have been provided to mount into an existing structure by means of the opening 34. The flash head 28 is then exposed through the windows 21 at the tip of the wing. Of course, the flash head 28 with its flash tube can be exposed in any other suitable manner to provide a radiation of the light provided to the surrounding area.

FIGS. 5, 6, 7 and 8 show a flash tube 36 which forms a portion of the flash head 28. In addition thereto, large power capacitors 38 and 40 are shown which provide the power for flashing the tube 36. A circuitboard 42 which has been dotted in is also shown. The circuitboard 42 contains the power supply as well as the timing function which breaks down the 400 cycles of the power supply provided by the plane to a usable signal to cause the tube 36 to flash.

The flash tube 36 has a trigger wire 44 associated therewith which wraps around the tube at least in part. The trigger wire is connected by means of a connecting wire 48 to the remainder of the circuit. The trigger wire 44 serves the function of causing the xenon gas in the tube to ionize for the passage of the current built up on the large capacitors 38 and 40 so that the device will flash.

The tube 36 is mounted in a mounting 50 at either end. The mounting 50 has an acorn nut 52 on one side and heat sink clips 54 on the other side with a beryllium oxide insulator 56 between the two. The heat sink clips 54 grip the tubes 36 by means of a metal end cap 55 of the tube. The heat sinks 54 are similar to those used for heat sinking in other electronic component applications to prevent overheating thereof. However, any suitable heat sink can be used, so long as it provides a substantial conduction of heat from the ends of the tube 36 to an adjacent area.

The foregoing causes a substantially extended life to the flash tubes 36. It has been found that the heat sinking method at the ends of the tubes has enhanced the life of the tubes to the point where they have generally lasted at least twice as long as the known life expectancy of such tubes on an average basis. As a consequence, the heat sink concept of utilizing any particular form of spring clip, mushroom clip, tulip-type component transistor heat sink clip, or any other means for bringing heat from the ends of the tubes and the tube proper is deemed to be a substantial enhancement of the invention and provides longer life as previously alluded to.

The housing for the power unit 30 can comprise a metal box or other closed unit with a flush face to mount against an extrusion 57 which forms the flash head 28. The extrusion 57 has a glass plate 59 mounted therein which serves the function of protecting and covering the interior of the space provided by the extrusion 57 for the tube 36. This enables the entire flash head 28 to be removed or attached and replaced in any suitable location, such as a remote location from the power unit 30. The entire extrusion 57 and power units 30 with their respective boxes and enclosures receive the screws shown within the bracket 32 securing the two together. The casing forming the power unit 30 has an input connector 60. The input connector 60 is provided with a neutral pin 62 and a power input pin 63 connected to the power of the plane through connection 64.

TIMER AND POWER MODULE ELECTRICAL DESCRIPTION

Figure 9:
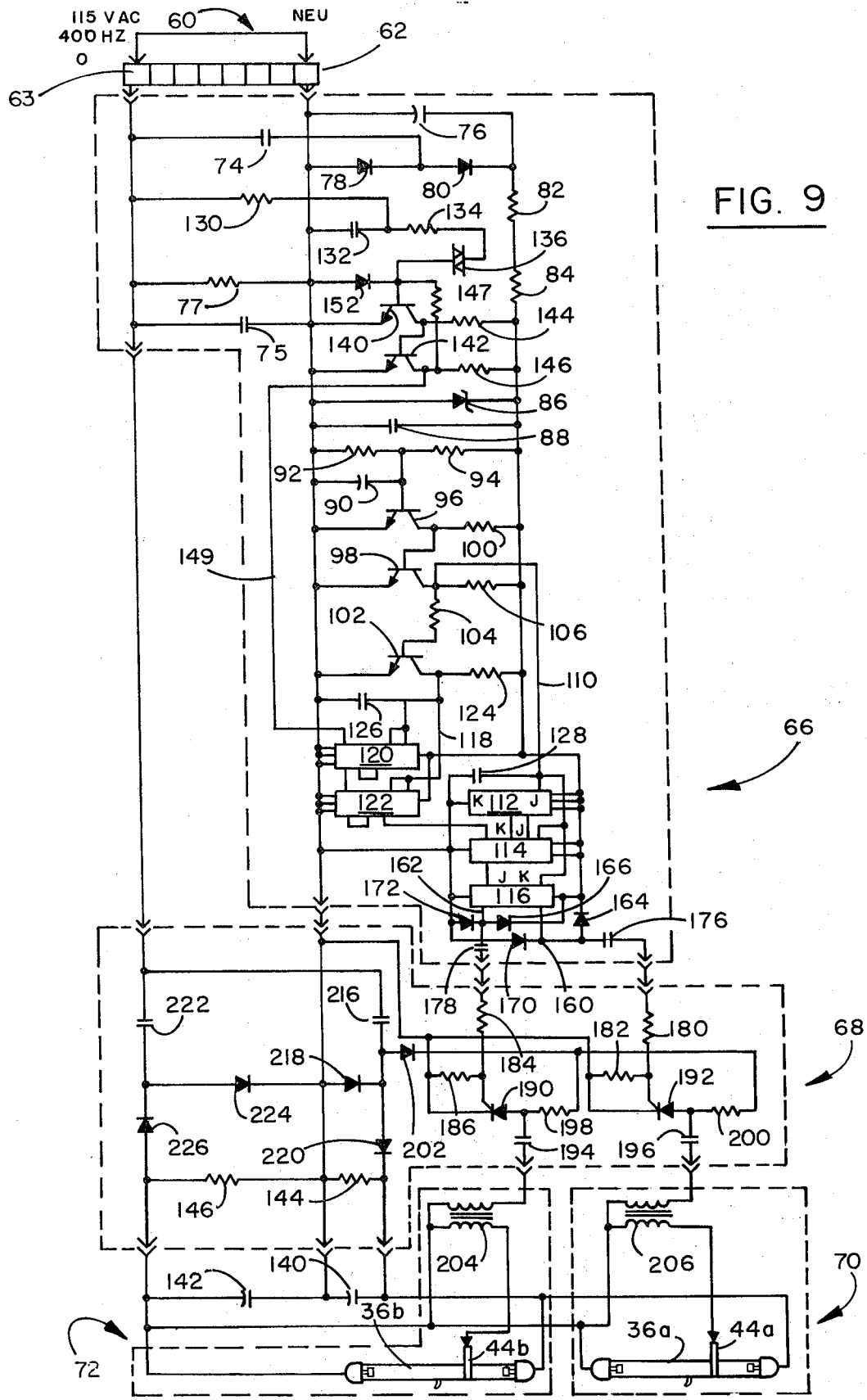
FIG. 9 shows a detailed schematic view of the invention as to a portion of the circuitry thereof; and, FIG. 10 shows a detailed schematic view of the invention incorporating the details of the remaining portion not shown in FIG. 9.

Looking more specifically at FIG. 9, the input connector 60 is shown as having a neutral connection 62 and a power input connection 63. The power input connection 63 is connected to a 115 volt 400 cycle alternating current supply. The supply emanates from the shipboard power of the aircraft, specifically, The aircraft's alternating generators.

A pair of flash head assemblies which are similar to the flash head 28 are shown. However, in order to differentiate the respective flash heads and their mode of operation on a wing, they have been designated flash heads 70 and 72. They are substantially equivalent to the flash heads on each wing, such as the flash head associated with 20 and 22.

In addition to the foregoing, a timing board 66 is shown with a power supply 68. The foregoing have been placed within a dotted configuration and can be interconnected by any suitable coupling means, such as a card interconnect.

Looking more particularly at the timing board 66, it can be seen that a capacitor 74 is shown. The capacitor 74 is a current limiting capacitor which limits the current of the 115 volt 400 cycle alternating current input. Capacitor 74 functions to limit the input power so that you do not have to have resistors which would be substantially heated up if they were to provide the current limiting function down to 5 volts.

A pair of diodes 78 and 80 each respectively operate as rectifying diodes. However, they serve the function of providing a voltage doubling effect across the peak-to-peak signal or voltage of the alternating current supply. The voltage doubling takes place by virtue of the negative and positive wave form each charging opposite sides of the capacitor. However, it should be noted that the voltage doubling effect across the peak-to-peak portion of the input current or voltage operates in conjunction with capacitor 74.

A storage capacitor 76 stores the signal received from the foregoing. Resistors 82 and 84 serve the function of providing a current limiting feature from the foregoing components.

A capacitor 75 forms an isolation function to isolate the circuit from the EMI generated by the aircraft. A resistor 77 serves to discharge capacitors 75, 216 and 222 so that there is not an ongoing shock hazard. As can be understood, if the capacitors 75, 216 and 222, which are of significant value, had a large voltage built up thereon, it would tend to shock people either during maintenance procedures, or in handling of the device. As a consequence, resistor 77 discharges the capacitors to eliminate the foregoing hazard.

The counters formed as flip-flops, or integrated circuits which are interconnected with the foregoing, must be maintained as to their voltage within relatively close tolerances. In order to perpetuate this, a zener diode 86 is utilized for holding this voltage at a proper level.

In order to filter noise from the supply input, a capacitor 88 is placed across a circuit from the power input.

A capacitor 90 is also shown, In order to build up a voltage on capacitor 90, a voltage divider established through resistors 92 and 94 is provided. When the voltage on capacitor 90 reaches a certain level, as determined by a time constant of the circuit, it turns on a transistor 96. This then serves to turn off a transistor 98. Transistor 98, as can be seen, is biased by a resistor 100.

When transistor 98 is turned off, it turns on a transistor 102 which is biased by biasing resistors 104 and 106. It should be noted that transistor 102 is also utilized as an inverter for inverting the voltage for the respective integrated circuits that follow.

Looking more particularly at the portions of the circuit that provide the integrated circuit functions, a line 110 which serves as a reset line, is shown connected to integrated circuit 112, 114 and 116. A line 118 serves as a reset line for integrated circuits 120 and 122.

As previously stated, the transistor 102 provides an inverter function so that opposite phased signals on lines 110 and 118 are perpetuated. These are the reset lines for the respective integrated circuits previously mentioned. The integrated circuits are flip-flops and the reset lines perform the function of providing a reset outside of their operative mode.

A resistor 124 biases the transistor 102 at its collector. The resistor 124 also serves to bias the integrated circuits 120 and 122. Capacitors 126 and 128 serve to filter the reset line, mainly those respective reset lines 118 and 110.

The alternating circuit signal input is placed upon a resistor 130 which provides a current limiting function. In order to develop any signals from the input of the circuit which can be properly oriented toward operating the integrated circuits, a pre-conditioning circuit is utilized. The circuit comprises a resistor 130 which functions as a current limiting resistor to the 115 volt supply. A capacitor 132 serves to filter any noise on the 115 volt line; and a resistor 134 provides a current limiting function to a diac 136. The diac 136 serves to partially square the 115 volt alternating current sine wave received thereat. A transistor 140 and a second transistor 142 serve the function of providing a schmitt trigger.

The foregoing transistors 140 and 142 are biased respectively by resistors 144 and 146. A diode 152 is utilized to rectify the voltage so that there are no negative going signals fed to the schmitt trigger transistors 140 and 142. In addition to the foregoing resistors 144 and 146, a resistor 147 is provided for the feedback function of the schmitt trigger.

From the transistor 142, a signal on line 149 is presented which has a substantially square wave form. The square wave is capable of being used by the memory of the circuitry forming the integrated circuits 112, 114, 116, 120 and 122.

Looking more particularly at the integrated circuits in the form of logic circuits 120 and 122, the integrated circuit 120 provides the function of dividing by 10.

Thus, the 400 cycle alternating current square wave on line 149 is first of all divided down to 40 cycles. After this point, it is then sequentially divided by integrated circuit 122 from 40 to 4.

The output from integrated circuit 122 is introduced to integrated circuit 114 which operates in conjunction with integrated circuit 112.

The integrated circuits 112 and 114 provide a divide by three function by feedback control of their respective flip-flops through the respective lines therebetween. In essence, integrated circuits 112 and 114 divide the 4 cycles emanating from integrated circuit 122 by three.

Integrated circuit 116 also provides the function of dividing by two. As a consequence, the whole network of integrated circuits 112, 114 and 116 provide the function of dividing by six.

An integrated circuit 116 is also provided with an alternate flip-flop as an output. The alternate flip-flop thus causes the circuit to have a fifty percent duty cycle. The 50 percent duty cycle delivers a signal equivalent to the signal of 1 cycle every 1 and ½ seconds.

At points 160 and 162, there is an output which alternately drives respective flash tubes 36(a) and 36(b) in a manner to be described. A network of diodes 164, 166, 170 and 172 perform the function of clamping diodes.

More specifically, the diode network 164 through 172 suppresses the spikes on lines emanating from the network. Diodes 164 and 166 form a network to provide a clipping function to hold a 5 volt signal to the line. In other words, it maintains the voltage at 5 volts regardless of what the voltage might in actuality be above 5 volts. Diodes 170 and 172 clamp any negative spikes to circuit ground.

Capacitors 176 and 178 are provided to perform a differentiating function with their respective resistors 180 and 184. The capacitors 176 and 178 also have a dual function inasmuch as they function as coupling capacitors, as well as blocking any steady state signals.

Resistors 182 and 186 serve to bias the gates of SCR's 192 and 190 respectively.

The signals emanating from the foregoing circuitry are utilized to gate the silicon controlled rectifiers (SCR's) 190 and 192. They effectively create a signal on the trigger wire, namely trigger wire 44 of the flash tubes 36(a) and 36(b). Capacitors 194 and 196 are charged through resistors 198 and 200. When the capacitors 194 and 196 discharge, they create a signal on the trigger wire 44, as previously alluded to.

A diode 202 serves the function of providing a DC charging path from the power supply.

Transformers 204 and 206 are connected to the respective capacitors 194 and 196. The transformers 204 and 206 increase the voltage substantially for the purpose of enabling the trigger wire 44 on each respective tube 36(a) and 36(b) to function. In other words, the respective trigger wires 44(a) and 44(b) of the tubes 36(a) and 36(b) are provided with a signal by the transformers 204 and 206. This causes the gas to be ionized in the tubes and flash.

TUBE POWER SUPPLY

Looking more particularly at the remaining circuitry which provides power for the tubes 36, it can be seen that a capacitor 216 and diodes 218 and 220 are provided. They function in conjunction with a second capacitor 222 and diodes 224 and 226. The foregoing diodes and respective capacitors create a voltage quadrupler. In other words, they function to provide a quadrupling of the voltage for increased operational power of the flash tubes by charging oppositely each side of the capacitors respectively.

In order to flash the tubes 36(a) and 36(b), or for that matter, any tubes within a flash head 28 of this invention, discharge capacitors 140 and 142 are utilized. These are substantially large capacitors and equivalent to the capacitors shown as capacitors 38 and 40 in the foregoing figures. They are capable of building up substantial charges across the discharge terminals of the tubes 36(a) and 36(b). As a consequence, the capacitors 140 and 142 when not in use, would be bled of their charge. In order to provide this function, resistors 144 and 146 are respectively used to bleed the capacitors.

The fifty percent duty cycle of the output of the integrated circuit 116 causes the trigger capacitors 194 and 196 to alternatively operate the tubes 36(a) and 36(b). In this manner, considering a 400 cycle alternating current which is initially provided, the two tubes respectively operate every 1 and ½ seconds. However, inasmuch as there is a 50 percent duty cycle, a flash occurs every three quarters of a second.

The flash heads 28 can be ganged in the manner as shown in FIG. 9, or they can be provided as single units eliminating the circuit that causes each one to respectively operate. The flash heads 28 operating in tandem can be placed on the front and the back of the wing.

It should be noted that integrated circuit 112 can be eliminated. If the integrated circuit 112 is eliminated, the flashing would not be every one and a half seconds, but only every second. Thus, depending upon whether or not integrated circuit 112 is provided which creates the division previously alluded to, the circuit will either function on one timed basis or the other, depending upon the type of flash that is required.

FLASH TUBE AND NAVIGATION LIGHT COMBINATION

Looking more specifically at the other figures, namely FIGS. 3 and 4, a navigational light 300 is provided with a strobe light section 302. The respective navigation lights and strobe lights when used as a combination, can function so that the strobe light 302 can be turned on or off at the pilot's discretion. Furthermore, the navigation light 300 can be on regardless of whether the strobe light portion 302 is flashing.

The navigation light 300 is an incandescent bulb having a base 304, with a spring socket 306 and a hot or plus side connected to a line 308. The foregoing sockets are known in the art and do not have to be further described. The bulb has a base which connects to a line 308 and can be generally provided with a circuit to its ground.

A strobe light portion 302 operates on normal strobe or flash tube principles. It is provided with a helical coil 312. The helical coil 312 is placed within a base 314 with leads 316 attached thereto. The helical coil 312 is triggered by a trigger wire (not shown) which causes xenon gas therein to ionize and discharge capacitors in a similar manner to the foregoing flash tube description of flash tubes 36.

The foregoing assembly can be mounted completely in a unit as shown in the form of unit 318. The unit 318 can be riveted to the skin or other portion of the wing 320, by means of rivets 322. In this manner, the device can provide a function of both the navigation lights and flashing tubes.

SWITCHING CONFIGURATION

Figure 10:
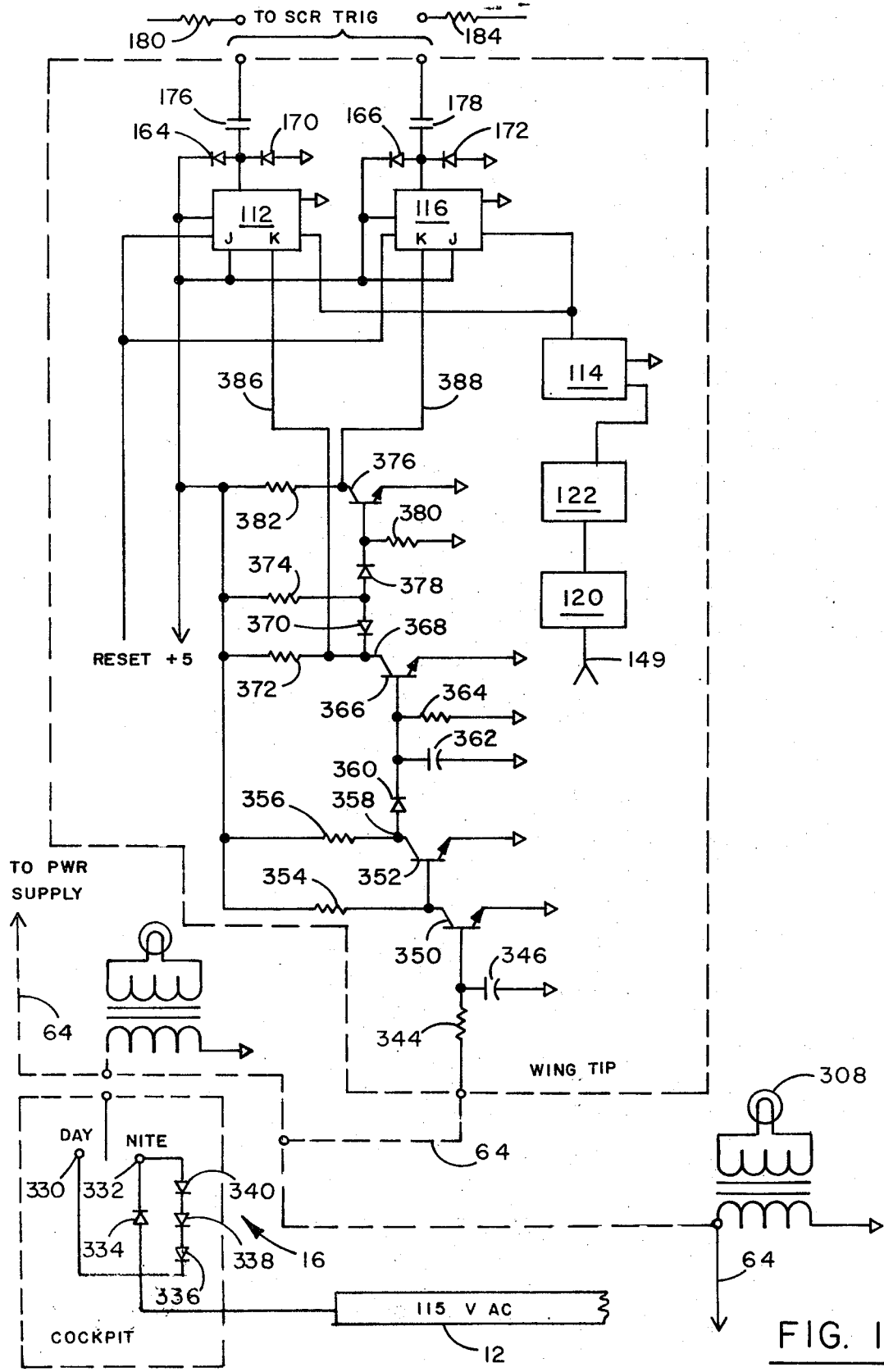

Looking more specifically at the switching configuration of FIG. 10, it can be seen that a bus equivalent to the bus 12 is shown with a cockpit. The bus 12 provides the same functions as previously described with regard to the other circuits. The cockpit switch 16 has been shown within a dotted configuration. The cockpit switch has three positions. The three positions include a center or off position, which is shown, and a day and night position provided by terminals 330 and 332. Of course, the day and night position can be reversed with an attendant inversion of the remaining circuit for appropriate operation. The terminals are connected to a diode matrix comprising a first diode 334 and diodes 336, 338 and 340 which are in series with each other, but in parallel with diode 334.

The foregoing diode matrix provides an average direct current level on the line having a positive value. The positive value is obtained by reason of the fact that when a sine wave from the supply is in a positive mode, it only drops a limited amount through diode 334. If the sine wave is going negatively, it drops significantly more through diodes 336, 338 and 340. This causes an implacement of a relatively positive DC component on the AC line during the generation of the cycle. However, this is dependent upon the cycle passing through the respective diodes of the diode matrix.

In other words, in passing through the diode matrix, the relative voltage shift is actually a positive voltage shift upwardly with respect to the amplitude of the AC signal. This is due to the fact that in effect the DC component provided by the three diodes shifts the signal upwardly because they make the negative portion of the sine wave smaller with respect to the positive side. The positive drop of the alternating current amplitude shift is made less by the single diode as opposed to the three diodes because of the respective drops in the series relationship on the negative side.

It should be noted that there can be a negative pulse placed on the line, rather than the positive pulse by substitute rearrangement of the diodes 339 through 340 which would be opposite in polarity on the existing line.

Looking more particularly at the ensuing circuit, a resistor 344 is shown connected to a capacitor 346. The foregoing resistor and capacitor act as an integrator, or more specifically, a filter. Thus, they serve to filter the alternating current components from the line so that the substantially remaining electrical value on the line is a direct current value provided by the diode matrix.

It should be noted that the general result desired is to turn the respective flashing lights 36(a) and 36(b) on throughout the system. These, of course, would be the respective day or night flashing lights corresponding to positions 330 or 332 of the switch 16.

A pair of transistors 350 and 352 are shown. When there is a DC level on the line, transistor 350 is turned on which accordingly turns off transistor 352. The transistors are respectively biased by resistors 354 and 356.

Leading from the collector side of transistor 352, in other words, at point 358, a diode 360 is implaced which allows the charging of a capacitor 362. Capacitor 362 in conjunction with a resistor 364, provides an RC network for time delaying the electrical network. In other words, the charge on capacitor 362 in this mode will delay activity in the remainder of the circuit until a sufficient charge is built upon thereon.

A transistor 366 is shown connected at its collector terminal 368 to a second diode 370, and the K terminal of the flip-flop within the integrated circuit 112 previously described. It should be noted that when the transistor 366 is turned on, transistor 352 is turned off. In other words, transistor 352 turns on transistor 366.

A resistor 372 supplies current to operate the flip-flop in the integrated circuit 112. A resistor 374 supplies current to operate a transistor 376 which is coupled through a diode 378. A resistor 380 serves to turn off the transistor 376 when transistor 366 is turned on. A second resistor 382 functions to bias the flip-flop of the integrated circuit 116 previously described.

A pair of reset lines 386 and 388 are connected to the respective flip-flops of the integrated circuits 112 and 116 at their K terminals. As an aside, the K and J terminals of the integrated circuit were not connected in the same manner in the previous embodiment and the K terminals of the flip-flop are the reset position and have been interconnected through lines 386 and 388 to the switching circuit. It should be noted that the function of the system is basically to turn on lights or the strobes in the flash head 28 that are respectively labeled 36(a) or 36(b) by utilization of the existing circuitry shown in the previous figures. Specifically, the connection of line 149 to flip-flops 120 and 122 in the integrated circuit is shown. The integrated circuit 114 is substantially the same as the previous circuitry described.

Stated another way, the former embodiment operates the tubes 36(a) and 36(b) on a simultaneous basis wherein those simultaneous modes could be on the front or the rear of the wings. However, with the switching provided by the device shown in FIG. 10, either one flashing tube 36(a) or the other 36(b) can be activated through the interconnections to resistors 180 and 184.

In the night mode, integrated circuit 116 is running an integrated circuit 112 is in the reset mode. When the day switch is on, the integrated circuit 112 is operating and the integrated circuit 116 is in the reset mode. This is due to the fact that the signal on capacitor 346 is no longer existent and drains off through the resistor 344 so that all that is seen is the AC portion of the signal.

The foregoing switching circuit will function to operate the respective lights which have been connected in the foregoing mode. It will also enable the tubes 36(a) or 36(b) which it is connected to, to operate in the alternative or operate a navigational light 308 as shown in conjunction therewith.

The pulses through circuits 120, 122 and 114 are used as trigger pulses to control the flash tubes in the manner previously described. Capacitors 176 and 178, of course, form a circuit in the existing circuitry for this device to be connected to resistors 180 and 184.

Thus, this switching apparatus when connected to the unconnected K terminals through lines 386 and 388 enable one or the other light to function, namely tubes 36(a) or 36(b). The foregoing tubes can be the respective night and day lights of the system.

As a consequence of the foregoing, it should be understood that this invention has wide application as to switching between strobe lights or flashing lights, as well as the utilization of lights with the existing aircraft circuits.

We claim:

1. An aircraft warning lamp system adapted to function with an alternating current power supply from said aircraft comprising:
   means adapted to connect said system to the alternating source of current from said aircraft;
   A power supply module connected to said alternating current connection means;
   means connected to said power supply module for dividing the cyclical fluctuations of said alternating current for purposes of providing signal pulses; and,
   a high intensity light connected to and adapted to be driven by said power supply when triggered by said dividing means.

2. The aircraft warning lamp system as claimed in claim 1 wherein said means for dividing the cyclical alternating current comprises:
   a flip-flop in combination with a second flip-flop connected through said source of alternating current 3. An aircraft warning lamp system as claimed in claim 2 further comprising:
   means to limit the current within said power supply module.

4. The aircraft warning lamp system as claimed in claim 3 wherein said current limiting means comprise:
   a capacitor in combination with at least one diode.

5. The aircraft warning lamp system as claimed in claim 2 further comprising:
   a Schmitt trigger for substantially squaring the wave form of said alternating current prior to the signal therefrom being introduced to said flip-flops.

6. The aircraft warning lamp system as claimed in claim 5 further comprising:
   a voltage multiplying means connected to said power supply module comprising at least two diodes and a capacitor; and,
   a capacitor for storing energy connected to said voltage multiplying means for providing a voltage to said high intensity lights.

7. The aircraft warning lamp system as claimed in claim 6 further comprising:
   a trigger wire adjacent said high intensity light connected to said flip-flop circuit which provides the timing means for purposes of providing a signal and trigger wire to ionize the gas in said high intensity lights.

8. The system as claimed in claim 2 further comprising:
   a plurality of high intensity lights connected to said power supply; and,
   switching means for causing one or both of said high intensity lights to function.

9. The system as claimed in claim 2 further comprising:
   an incandescent bulb mounted in combination with said high intensity lights for providing an incandescent light and a flashing light driven from the same power supply module.

10. The system as claimed in claim 7 further comprising:
    a separable head containing said high intensity light for electrical connection to said power supply module.

11. The system claimed in claim 5 wherein:
said alternating current source is provided from an aircraft generator having approximately a 400 cycle 115 volt or less output; and,
said flip-flop circuits divide said 400 cycles to provide a cyclical signal of 4 cycles or less per second.

12. The combination of an aircraft having an alternating current power supply and a warning lamp system wherein at least one of said warning lamps is a flashing high intensity lamp comprising:
a power module adapted to be connected to the existing wires of said aircraft which serve the previously existing lamps of said aircraft;
a high intensity lamp adapted to be powered by the alternating current delivered to said power module; and,
means within said power module for dividing the cyclical changes of said alternating current into pulses for sequentially flashing the high intensity lamps.

13. The combination as claimed in claim 12 further comprising:
a plurality of high intensity lamps for service in said aircraft.

14. The combination as claimed in claim 13 further comprising:
a switch for alternately lighting said high intensity lamp.

15. The combination as claimed in claim 12 wherein said cyclical division means comprise:
at least one flip-flop circuit.

16. The combination as claimed in claim 12 further comprising:
a circuit for squaring the wave form of said alternating current interconnected between said cyclical division means so that the input thereto is a substantially squared wave form.

17. The system as claimed in claim 12 further comprising:
a voltage multiplier; and,
storage capacitors connected to said voltage multiplier and said high intensity lamps for providing power thereto.

18. The combination as claimed in claim 14 wherein said switching comprises:
a diode matrix; and,
means to select between said diode matrix and a second source of power to said power module.

19. The combination as claimed in claim 18 wherein said diode matrix comprises:
a plurality of diodes in parallel with a lesser amount of diodes.

20. The combination as claimed in claim 19 wherein:
said flip-flops are connected to said diode matrix and controlled from an operative mode to a reset mode by said diode matrix.

21. The combination as claimed in claim 20 further comprising:
a transistorized switching means between said diode matrix and said flip-flops for causing said flip-flops to be placed in a reset or operative condition.

* * * * *